US012208627B2

(12) United States Patent
Alazzam et al.

(10) Patent No.: US 12,208,627 B2
(45) Date of Patent: Jan. 28, 2025

(54) INKLESS PRINTER USING PHOTOSENSITIVE INK

(71) Applicant: Khalifa University of Science and Technology, Abu Dhabi (AE)

(72) Inventors: Anas Alazzam, Abu Dhabi (AE); Nahla Alamoodi, Abu Dhabi (AE)

(73) Assignee: Khalifa University of Science and Technology, Abu Dhabi (AE)

(*) Notice: Subject to any disclaimer, the term of this patent is extended or adjusted under 35 U.S.C. 154(b) by 45 days.

(21) Appl. No.: 17/557,882

(22) Filed: Dec. 21, 2021

(65) Prior Publication Data

US 2022/0194096 A1 Jun. 23, 2022

Related U.S. Application Data

(60) Provisional application No. 63/129,341, filed on Dec. 22, 2020.

(51) Int. Cl.

| | |
|---|---|
| ***B41J 2/44*** | (2006.01) |
| ***B41J 2/45*** | (2006.01) |
| ***B41J 2/455*** | (2006.01) |
| ***B41J 2/475*** | (2006.01) |
| ***B41M 5/28*** | (2006.01) |
| ***B41M 5/34*** | (2006.01) |

(52) U.S. Cl.
CPC ............. *B41J 2/4753* (2013.01); *B41J 2/442* (2013.01); *B41J 2/45* (2013.01); *B41J 2/455* (2013.01); *B41M 5/284* (2013.01); *B41M 5/34* (2013.01)

(58) Field of Classification Search
CPC ..... B41J 2/442; B41J 2/45; B41J 2/455; B41J 2/4753; B41M 5/284; B41M 5/34
See application file for complete search history.

(56) References Cited

U.S. PATENT DOCUMENTS

2006/0197333 A1* 9/2006 Hoffman .................. G03C 1/50 427/457
2010/0296127 A1* 11/2010 Barndt ............... G06K 15/1247 358/3.24
2018/0030289 A1* 2/2018 Jarvis ..................... C08K 3/042

FOREIGN PATENT DOCUMENTS

WO WO-2014080157 A1 * 5/2014 ......... B23K 2103/50
WO WO-2018138232 A2 * 8/2018 .............. B41M 5/26

* cited by examiner

*Primary Examiner* — Douglas X Rodriguez
*Assistant Examiner* — Kendrick X Liu
(74) *Attorney, Agent, or Firm* — Kilpatrick Townsend & Stockton LLP

(57) ABSTRACT

A substrate can be positioned for coating by a deposition device. The deposition device can coat the substrate with photosensitive material. The coated substrate can be positioned for exposure to light from a light source. The light source can expose a portion of the coated substrate to light to produce printed information.

14 Claims, 6 Drawing Sheets

INKLESS PRINTER USING PHOTOSENSITIVE INK

CROSS-REFERENCES TO RELATED APPLICATIONS

This application claims the benefit of U.S. Provisional Application No. 63/129,341, filed on Dec. 22, 2020, the entire contents of which are hereby incorporated for all purposes in their entirety.

BACKGROUND OF THE INVENTION

Businesses worldwide use many types of printers including thermal printers, laser printers, and/or inkjet printers. Thermal printers can use heat to perform the printing process on thermal papers. Inkjet printers spray thousands of ink droplets on a paper which can form information. Laser printers use a laser to alter the distribution of charges on a drum that uses electrically charged ink to print the information. Inkjet printing requires the use of ink to perform printing, laser printing includes the use of tuner which can be expensive, and thermal printing can involve the use chemicals that can cause health problems.

DETAILED DESCRIPTION OF THE INVENTION

Figure 1:
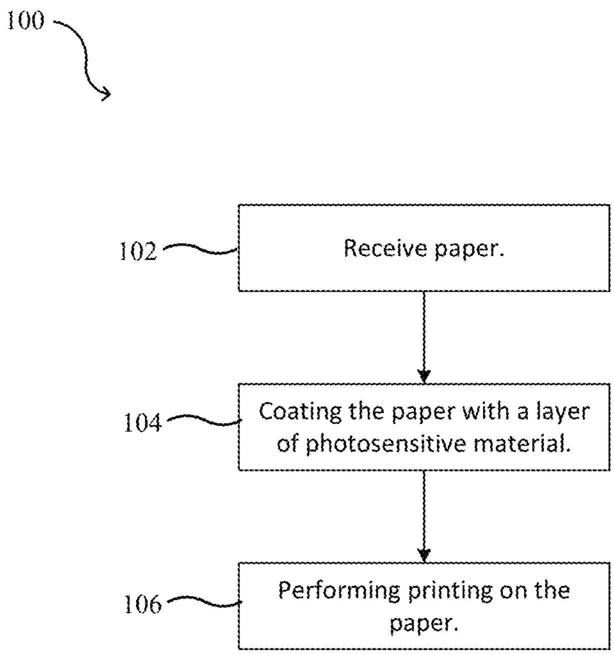
FIG. 1 is a flowchart illustrating a process for printing using a laser-inkless printer, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Inkjet printing, laser printing, and thermal printing are just some of the commercially-available printing techniques. Inkjet printing is commonly used for printing at a small scale and can include depositing small droplets of ink on the surface of the paper to perform printing. Ink cartridges used by inkjet printers can produce a large amount of waste. For example, 375 million empty ink cartridges are thrown out yearly with many of the empty cartridges ending up in landfills. Further, it can take hundreds of years for an ink cartridge to fully decompose. Laser printing can produce high quality images and texts by patterning the charges on the surface of a rotating cylinder using a laser beam. The cylinder collects electrically charged ink powder (tuner) to perform printing. Thermal printing is realized by selectively heating thermal papers. These papers are coated with thermally sensitive material that changes color when heated. Thermal printing is used in wide range of applications such register receipts, and airline and train tickets. Thermal papers can be coated with Bisphenol A BPA, which has been shown to play a role in the pathogenesis of several endocrine disorders (e.g., female and male infertility, precocious puberty, hormone dependent tumors such as breast and prostate cancer and several metabolic disorders).

In various embodiments described herein, a printing system is described. The printing system can include a printer that uses paper coated with a photosensitive material to perform printing. The photosensitive material can be or include a non-toxic biocompatible photosensitive material to perform the printing process. The use of non-toxic biocompatible photosensitive material can protect users from being exposed to toxic chemicals during the printing process. Further, waste generation is reduced because ink cartridges (e.g., ink cartridges used in grayscale inkjet printers) are not required for printing.

Examples herein are directed to, among other things, systems and techniques relating to laser-inkless printer technology. The techniques described herein may be implemented by any printing technology, but particular examples described herein include inkless printing technology that uses a laser beam to perform printing on a surface coated with a photosensitive material. The laser beam can alter the chemical structure of the photosensitive material which can produce new material (e.g., new material that has a different color). The inkless printing technology can use paper coated with biocompatible and photosensitive material to perform printing. The photosensitive material can be or include graphene oxide (GO). The GO can change color once exposed to light and/or a laser beam. For example, the unexposed GO layer can be transparent and can turn brown/black once exposed to light and/or the laser. The new technology contributes to the goal of having healthy lifestyle and improves health quality by minimizing the probability of being exposed to toxic materials.

Turning now to a particular example, in this example, the printing technology can include coating an area of a substrate (e.g., a piece of paper) with a layer of graphene oxide (GO). Printing can be performed on the substrate by, for example, selectively exposing the coated portion of the substrate to light using a light source. For example, a focused light beam can be directed at the coated area of the substrate to perform the printing. The area exposed to the light can change color and show printed information (e.g., letters, images, an electrode, and/or any other type of media that can be stored in a computer file). The color of the printed information can be changed by changing one or more properties of the light source or the light emitted from the light source (e.g., the intensity of the light, the wavelength of the emitted light, and/or a pattern of emission). For example, the color can change from light brown to a dark brown/black color.

Figure 2C:
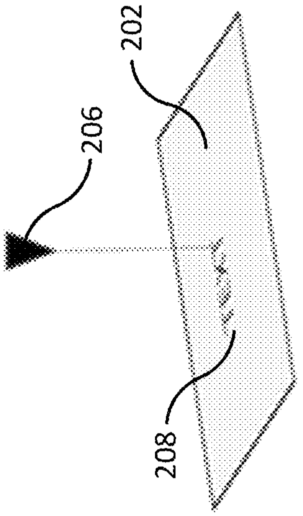
FIGS. 2A, 2B, and 2C illustrate various states of components that may be implemented using the process of FIG. 1, according to various embodiments.

Turning to the figures, FIG. 1 illustrates a process 100 for printing using a laser-inkless printer. Various blocks of the process 100 are described by referencing the components shown in FIGS. 2A through 2C, however, additional or alternative components may be used with the process. The process 100 at block 102 can include receiving a substrate, for example, the substrate 202 shown in FIG. 2A. The substrate 202 can be or include paper (e.g., a piece of paper), polymers, metal, cardboard, cardstock, plastic, fabric, and/or any suitable material. For example, the substrate 202 can be or include xerographic bond paper. In various embodiments, the substrate 202 can include photosensitive material (e.g., graphene oxide). For example, the substrate 202 can include photosensitive material on the surface of the substrate 202.

Figure 2B:
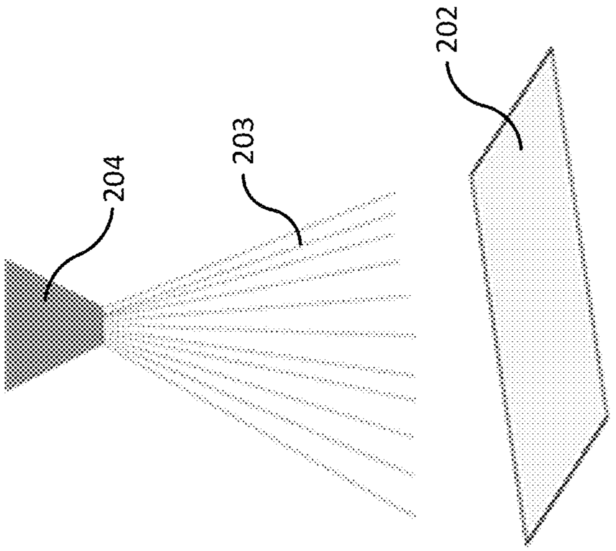
Figure 2A:
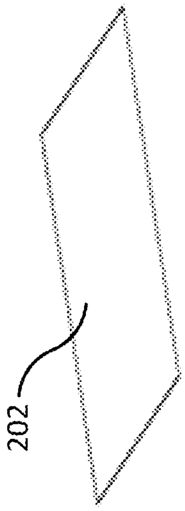

The process 100 at block 104 can include coating some or all of the substrate 202 with a layer of photosensitive material 203 (e.g., graphene oxide). As shown in FIG. 2B, the substrate 202 can be coated using a deposition device 204. The deposition device 204 can be or include a sprayer, roller, a brush, a coating, and/or any suitable coating device. In some embodiments, the thickness of the photosensitive material 203 can be on the nano-scale. However, the photosensitive material 203 can be any suitable thickness. The photosensitive material 203 can be or include non-toxic biocompatible and photosensitive material. For example, the photosensitive material 203 can be or include water-based graphene oxide mixed with alcohols (e.g., ethanol and/or iso-propanol). Mixing the graphene oxide with alcohols can enhance the wettability of the photosensitive material 203 on the substrate 202 and/or enhance the graphene oxide dispersion stability.

The process 100 at block 106 can include performing printing (e.g., on the substrate 202). As shown in FIG. 2C the printing can include exposing the photosensitive material to light using a light source 206. The light source can be or include a focused light beam, a laser, and/or a low-power laser beam. The light source 206 can be directed at the coated substrate 202 to expose certain areas of the substrate 202. The exposed areas of the substrate 202 can change color to show information 208 (e.g., an image, letters, text, and/or any other type of media that can be stored in a computer file). Exposing the coated substrate 202 to light from the light source 206 can additionally or alternatively alter the surface energy of the substrate 202 and/or can change the electrical properties of the substrate 202. For example, exposing the coated substrate 202 to light from the light source 206 can change the surface energy and/or the electrical properties of the printed area of the substrate 202 (e.g., where the information 208 is printed on the substrate). Changing the surface energy and/or the electrical properties of the printed area of the substrate 208 can change one or more properties of the printed information 208. For example, change the surface energy and/or the electrical properties of the printed area of the substrate 208 can change the color of the printed information 208.

In various embodiments, the information 208 can be or include one or more electrodes. The light source 206 can have a minimum intensity that can still alter the color of the photosensitive material. For example, the light source 206 operating below the minimum intensity may not cause the photosensitive material to change color. The light source 206 can provide an intensity of light in the range between 0 mW and 225 mW (e.g., between 10 mW and 100 mW). However, the light source 206 can provide light with one or more properties (e.g., the intensity, the wavelength of the emitted light, and/or a pattern of emission) that is suitable to change the color of the photosensitive material without burning the substrate 202. In various embodiments, a light source 206 that provides a very high intensity light may alter the structure of the substrate 202.

The size of the beam of the light source can change the resolution of the printed information 208. For example, a large beam of light can print information 208 with a lower resolution than information 208 printed using a small beam of light. The intensity of the light from the light source 206 can change the color of the printed information 208. For example, the intensity of the light from the light source 206 can change the color of the photosensitive material. The intensity of the light from the light source 206 can change the color of the photosensitive material without changing the structure of the substrate 202. In some embodiments, performing printing on the substrate 202 can include exposing the coated substrate 202 through a shadow mask that can define the exposed and/or unexposed areas of the substrate 202.

Figure 3:
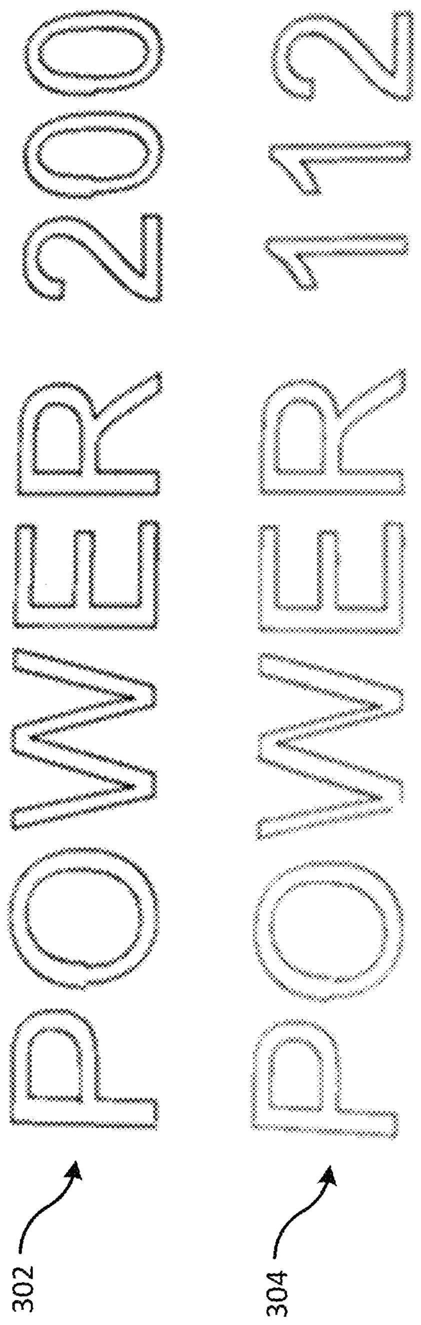
FIG. 3 shows an example of printing using the process of FIG. 1, according to various embodiments.

FIG. 3 shows examples of printing with the light source 206 at various intensities. For example, the color can go from a light brown color to a dark brown/black color based on the intensity of the light source 206. The information 302 can be printed using the light source 206 operating at a higher intensity than the intensity that is used to print information 304. Additionally or alternatively, the information 302 can be printed using a light source 206 with a higher intensity than a light source 206 that is used to print the information 304. The information 302 and 304 can be or include images, texts, and/or any other type of media that can be stored in a computer file.

Figure 4:
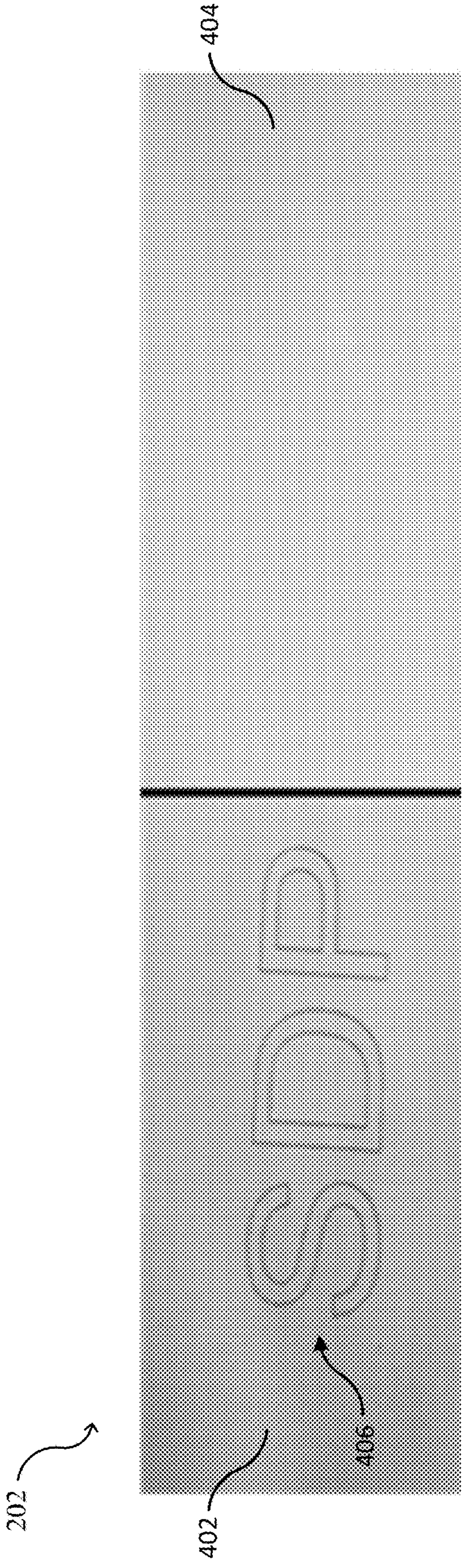
FIG. 4 shows an example substrate with a coated area and an uncoated area that can be used with the example printing process of FIG. 1, according to various embodiments.

Turning to FIG. 4, an example substrate 202 with a coated area 402 and an uncoated area 404 is shown. The light source 206 can alter the structure of the photosensitive material (e.g., graphene oxide) without altering the structure of the paper. For example, the light from the light source 206 can react with the photosensitive material on the coated area 402 to print information 406 and the light from the light source 206 can be unreactive with the uncoated area 404 such that the uncoated area 404 is free of information. The information 406 can be or include images, text, and/or any other type of media that can be stored in a computer file.

The size of the information 406 can be based on the font size of the information 406. Font size is measured in pt. (points) which indicates the height of letters, there are 72 points in one inch. For example, the font size 72 pt. would be about one inch tall, and 36 pt. would be about a half of an inch.

In various embodiments, the thickness of the photosensitive material on the coated area 402 can affect the brightness of the information 406. For example, the thicker the photosensitive material is on the coated area 402 the darker the information 406 will be and the information 406 will be brighter/lighter when the thickness of the photosensitive material is reduced.

Figure 5:
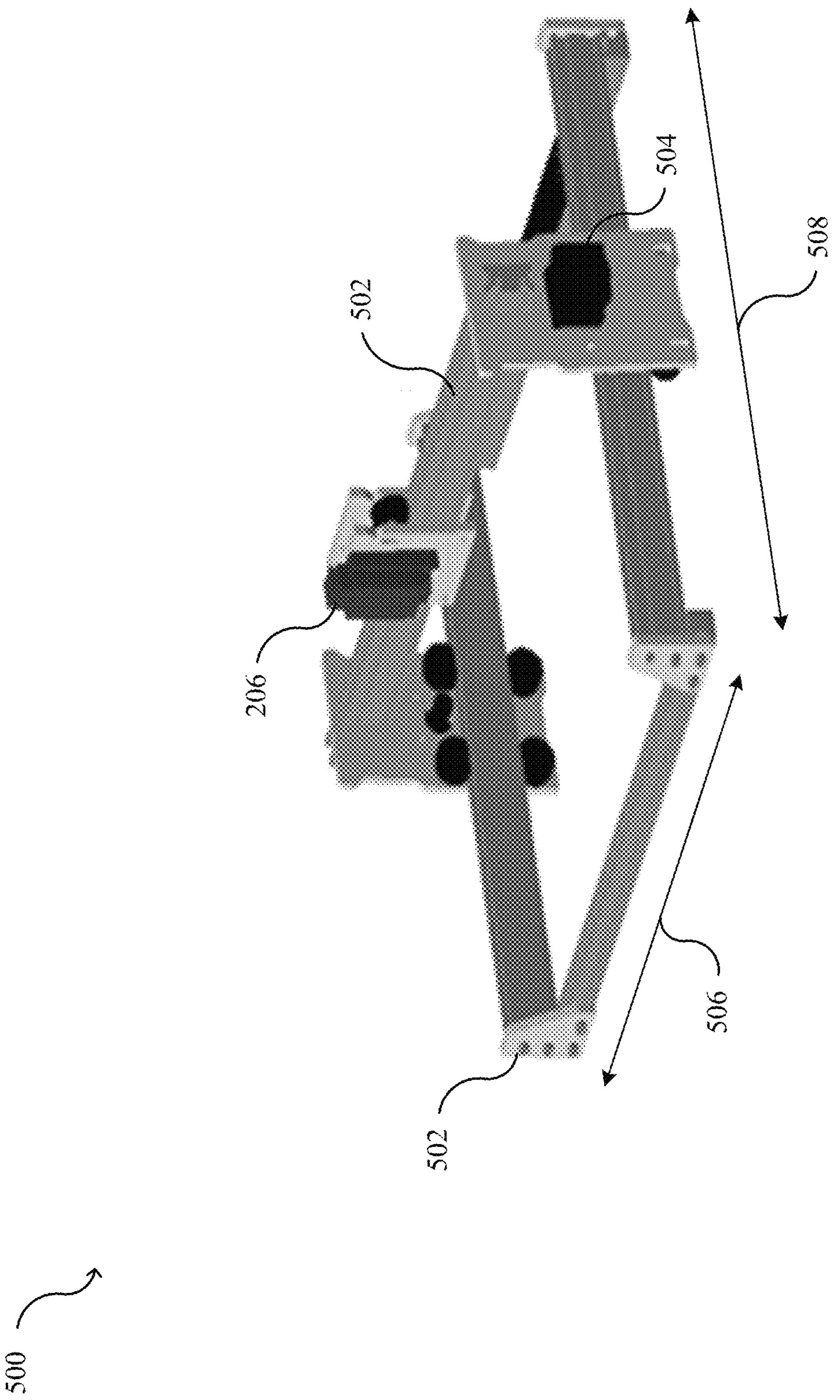
FIG. 5 is an example printer that can be used with the example printing process of FIG. 1, according to various embodiments.

Turning to FIG. 5, an example printer 500 is shown. The printer 500 can include a light source 206 connected to a frame 502. The frame 502 can include an area where substrate 202 (e.g., coated substrate 202) can be positioned below the light source. The light source 206 can move along the frame 502 along one or more axes (e.g., directions). For example, the light source 206 can move along a first axis 506 and a second axis 508. The first axis 506 can be perpendicular to the second axis 508.

Movement along the two axes 506 and 508 can allow the light source 206 to print the information 208 on the substrate 202. For example, the light source 206 can be moved to various areas of the coated substrate 202 to expose the photosensitive material to light. The exposed area will then turn a different color. Moving the light source 206 around the substrate 202 allows the light source 206 to expose multiple areas of the substrate 202 to form the information 208.

The light source 206 can be moved along the frame 502 (e.g., along the axes 506 and 508) with a motor 504. The speed of the motor 504 can be adjusted to change one or more properties of the information 208 (e.g., the resolution and/or quality of the information 208). For example, moving the light source 206 at a lower speed can increase the resolution of the information 208. The motor can be or include a stepper motor.

Changing the speed at which the light source 206 moves and/or the intensity of the light source 206 can change one or more characters of the printed information 208. For example, a high intensity light source 206 can result in printed information 208 that is darker than printed information 208 that is printed using a low-intensity light source 206. The high intensity light source 206 can be the same light source 206 as the low intensity light source 206 (e.g., the printer 500 can include a light source 206 that can change between high and low intensity). Additionally or alternatively, the high intensity light source 206 and the low intensity light source 206 can be two different light sources 206. For example, a printer 500 can have two light sources 206 and/or a first printer 500 can have a high intensity light source 206 and a second printer 500 can have a low intensity light source 206.

Figure 6A:
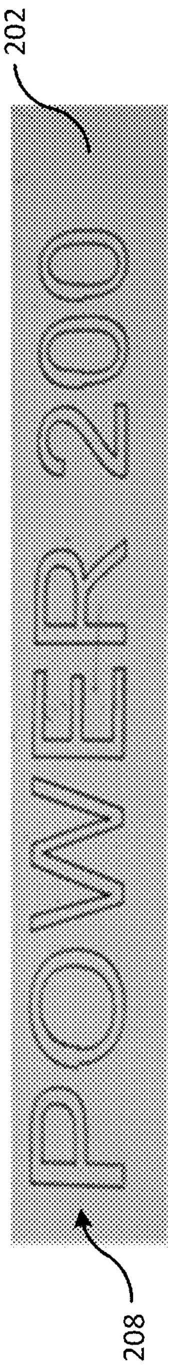
FIGS. 6A and 6B show examples of information printed on a coated area of a substrate using the printer of FIG. 5, according to various embodiments.
Figure 6B:
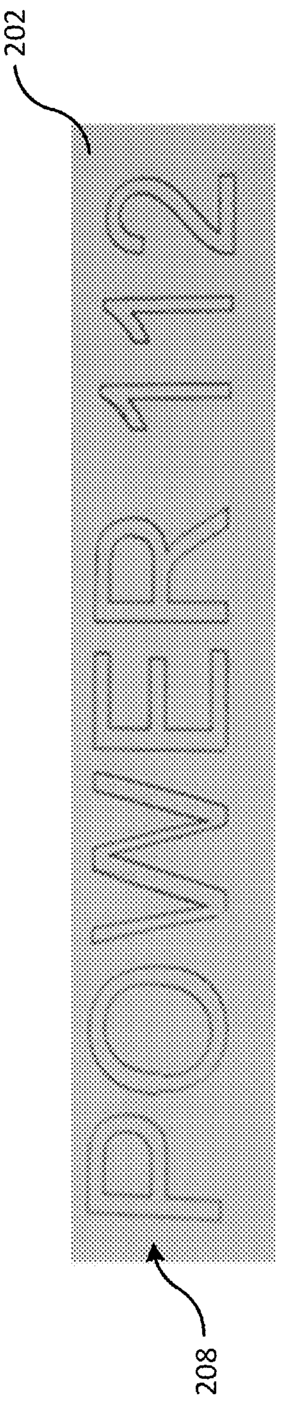

FIGS. 6A and 6B show examples of printing information 208 on coated areas of the substrate 202 using the example printer 500. The information 208*a* of FIG. 6A was printed with the light source 206 at a high intensity and the information 208*b* of FIG. 6B was printed with the light source 206 at a low intensity. The information 208*a* and 208*b* were printed with the light source 206 moving at the same speed (e.g., 500 mm/min), however, the information 208 and 208*b* may be printed with the light source 206 moving at different speeds. (e.g., with the light source 206 moving at a first speed to print a first portion and at a second speed to print a second portion).

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
- receiving a substrate at a deposition device;
- coating, using the deposition device, a graphene oxide layer onto the substrate;
- receiving the coated substrate at a light source; and
- printing, by at least changing an electrical property of the coated substrate based on light emitted using the light source, information onto the substrate, the printing comprising:
  - adjusting a resolution of the information by adjusting a size of beams emitted by the light source; and
  - exposing one or more areas of the coated substrate to the light from the light source according to a thickness of the graphene oxide layer coated on the substrate and a speed of moving the light source.

2. The method of claim 1, wherein the printing comprises changing property of the light emitted from the light source based on at least the information.

3. The method of claim 1, wherein printing information onto the coated substrate comprises changing a color of the substrate using an intensity of the light source.

4. The method of claim 1, wherein the graphene oxide layer has a base color, and wherein printing the information onto the coated substrate comprises:
- applying one or more intensities from the light source to one or more portions of the graphene oxide layer to cause the one or more portions to have one or more surface energies and one or more colors.

5. The method of claim 1, wherein the graphene oxide layer has a base color, and wherein printing the information onto the coated substrate comprises:

applying one or more wavelengths or patterns of emission from the light source to one or more portions of the coated substrate to cause the one or more portions to have one or more surface energies and one or more colors.

6. The method of claim 1, wherein the information comprises an image, text, or an electrode.

7. The method of claim 1, wherein printing the information onto the substrate comprises printing, by at least changing a surface property of the coated substrate based on light emitted using the light source, the information onto the substrate.

8. A system comprising:

a deposition device positioned for depositing a graphene oxide layer onto a portion of a substrate when the substrate is in a coating position; and a light source configured to (i) expose, based on thickness of the graphene oxide layer coated on the substrate and a speed of moving the light source, the portion of the coated substrate comprising the graphene oxide layer to light to produce printed information and (ii) adjust a resolution of the printed information by adjusting a size of beams emitted by the light source, wherein an electrical property of the coated substrate is adjustable based on light emitted using the light source.

9. The system of claim 8, wherein the light source comprises a laser.

10. The system of claim 9, wherein the laser produces a light having an intensity between 0 mW and 225 mW.

11. The system of claim 8, wherein the substrate comprises paper or a polymer.

12. The system of claim 8, wherein the graphene oxide layer comprises water-based graphene oxide.

13. The system of claim 12, wherein the graphene oxide layer further comprises alcohol.

14. The system of claim 8, wherein the graphene oxide layer has a base color, wherein the light source is further configured to expose the portion of the coated substrate comprising the graphene oxide layer to the light at one or more intensities to produce printed information having one or more colors.

* * * * *